US009519571B2

(12) United States Patent
Li et al.

(10) Patent No.: US 9,519,571 B2
(45) Date of Patent: Dec. 13, 2016

(54) METHOD FOR ANALYZING TRANSACTION TRACES TO ENABLE PROCESS TESTING

(75) Inventors: Zhong Jie Li, Beijing (CN); He Hui Liu, Beijing (CN); Naomi M. Mitsumori, San Jose, CA (US); Krishna Ratakonda, Yorktown Heights, NY (US); Hua Fang Tan, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 2442 days.

(21) Appl. No.: 11/777,340

(22) Filed: Jul. 13, 2007

(65) Prior Publication Data

US 2009/0019428 A1    Jan. 15, 2009

(51) Int. Cl.
G06F 9/44          (2006.01)
G06F 11/36         (2006.01)

(52) U.S. Cl.
CPC .................. *G06F 11/3676* (2013.01)

(58) Field of Classification Search
CPC .................................... G06F 11/3676
USPC ................................. 717/124–138
See application file for complete search history.

(56) References Cited

U.S. PATENT DOCUMENTS 6,356,858 B1    3/2002  Malka et al.
6,968,286 B1    11/2005 Watkins
2005/0043919 A1  2/2005  Kennedy et al.
2005/0165822 A1  7/2005  Yeung et al.
2005/0166094 A1  7/2005  Blackwell et al.
2006/0059118 A1  3/2006  Byrd et al.

OTHER PUBLICATIONS

Barros et al., "A Critical Overview of the Web Services Choreography Description Language (WS-CDL)", Mar. 2005, www.bptrends.com, 24 pages.*
Kappel et al., "Web Engineering—The Discipline of Systematic Development of Web Applications", 2006, John Wiley & Sons, Ltd, pp. v-xvii, 1-366.*
Geoff Zeiss, "Between the Poles", May 2006, retrieved from http://geospatial.blogs.com/geospatial/2006/05/interoeprabilit.html, 2 pages.*
Jeff Hanson, "Take advantage of the benefits of loosely coupled Web services", Dec. 2002, retrieved from http://www.techrepublic.com/article/take-advantage-of-the-benefits-of-loosely-coupled-web-services/ , 9 pages.*
Khan, Mustafa Ghulam. "Test Coverage Analysis: A Method for Generic Reporting." Master's Thesis, Department of Computer Science, IIT Kanpur, Apr. 2000.

(Continued)

*Primary Examiner* — Ted T Vo
(74) *Attorney, Agent, or Firm* — Ryan, Mason & Lewis, LLP

(57) ABSTRACT

Techniques are provided for analyzing testing coverage of one or more software modules to provide process coverage statistics. The techniques include obtaining one or more coverage measures from a test specification document, performing a trace on each of the one or more coverage measures during a test, analyzing each trace to generate a run-time service choreography model for a process, wherein the model includes each of one or more service choreography patterns occurring in the process, and using the model to provide statistical data on test coverage according to a process definition.

17 Claims, 3 Drawing Sheets

(56) References Cited

OTHER PUBLICATIONS

Li, Z., et al, "BPEL4WS Unit Testing: Framework and Implementation." Proceedings of the IEEE International Conference on Web Services. vol. 00, Jul. 11-15, 2005 Wash. D. C.
Sreenivasa, Venkata Rao N. "Test Coverage Analyzer for Java." Master's Thesis, Department of Computer Science and Engineering, IIT, Kanpur, Apr. 2003.
Cornett, Steve. "Software Test Coverage Analysis." Bullseye Testing Technology, 1996.
Marick, Brian. "A Tutorial Introduction to GCT." Testing Foundations, 1996.
"World Wide Web Consortium Publishes First Public Working Draft of Web Services Choreography Description Language 1.0" downloaded Jan. 20, 2016 https://www.w3.org/2004/04/wschor-pressrelease.

* cited by examiner

METHOD FOR ANALYZING TRANSACTION TRACES TO ENABLE PROCESS TESTING

FIELD OF THE INVENTION

The present invention generally relates to information technology, and, more particularly, to a method for analyzing transaction traces to enable process testing.

BACKGROUND OF THE INVENTION

Services oriented architecture (SOA) is becoming a popular choice in building a flexible information technology (IT) infrastructure that can adapt quickly and economically to fast changing needs Repeatable tasks or "services" with well-defined interfaces, that are independent of the computing platforms and underlying applications, serve as the building blocks for this architecture. These "services" can be choreographed through composite applications in support of horizontal processes. As such, one process has different service choreographed patterns which represent different types of transactions for the same operation It is advantageous to do the choreograph coverage analysis because it will characterize all the possible interactions among services to serve requests.

Existing approaches focus on the source code to do program control structure coverage analysis such as, for example, statement coverage, blanch coverage, condition coverage, path coverage and so on. Such coverage analysis takes a source program as input, and inserts software probes into the source code. Using these software probes, existing approaches monitor the test run of the program and determine the coverage measures. Such coverage analysis does not provide process level test coverage analysis (for example, an entity process level coverage analysis) that can test the structural integrity of a distributed activity.

As such, the functional integrity of individual services may not guarantee the overall integrity of the process (that is, of the entity process). Existing approaches do not cover the errors that are introduced due to inconsistencies in message formats or differing coding assumptions across modules. Such coverage analysis will not provide the level of confidence in a software solution to clearly understand whether it meets an entity's requirements.

Therefore, there is a need to overcome the limitations of the existing approaches

SUMMARY OF THE INVENTION

Principles of the present invention provide techniques for analyzing transaction traces to enable process testing. An exemplary method (which can be computer-implemented) for analyzing testing coverage of one or more software modules to provide process coverage statistics, according to one aspect of the invention, can include steps of obtaining one or more coverage measures from a test specification document, performing a trace on each of the one or more coverage measures during a test, analyzing each trace to generate a run-time service choreography model for a process, wherein the model includes each of one or more service choreography patterns occurring in the process, and using the model to provide statistical data on test coverage according to a process definition.

In an embodiment of the invention, an exemplary method for generating a database of run-time service choreography models for a process can include obtaining one or more coverage measures from a test specification document, performing a trace on each of the one or more coverage measures during a test, analyzing each trace to generate a run-time service choreography model for a process, wherein the model includes each of one or more service choreography patterns occurring in the process, and storing the model in a database, wherein the database is used to provide statistical data on test coverage according to a process definition.

At least one embodiment of the invention can be implemented in the form of a computer product including a computer usable medium with computer usable program code for performing the method steps indicated. Furthermore, at least one embodiment of the invention can be implemented in the from of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
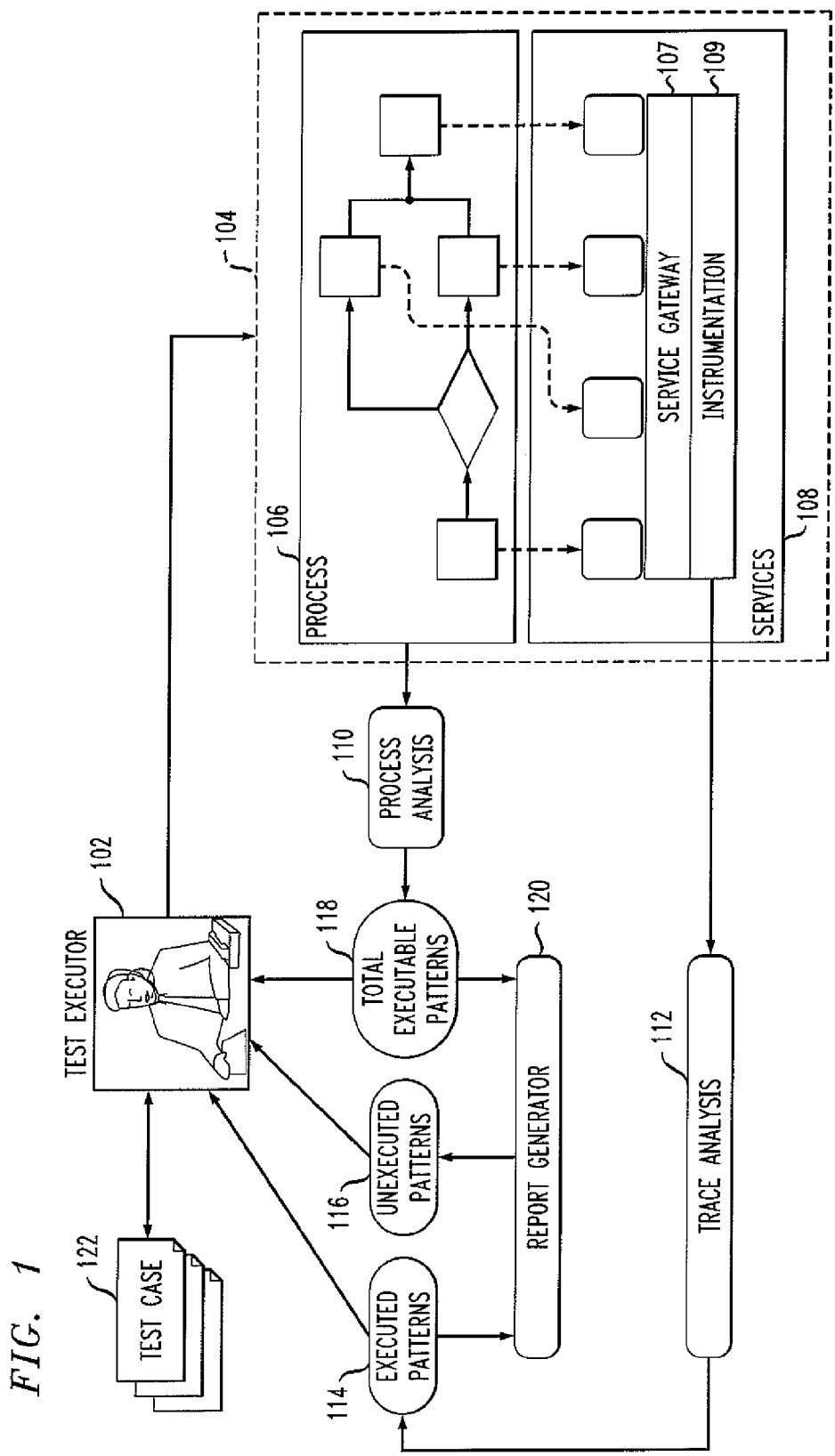
FIG. 1 shows a diagram illustrating exemplary implementation architecture, according to one aspect of the invention.

Principles of the present invention analyze process level test coverage using traces captured during production time. A test coverage analyzer speeds up the test process and minimizes the cost. In one or more embodiments of the invention, the coverage analysis tests the structural integrity of distributed loosely coupled "services" that are choreographed to perform a specific "process" (for example, an entity process). As described herein, principles of the present invention gather test coverage from traces so as to meet testing requirements.

Additionally, in determining whether the correct test cases are being used, in many cases, complete test coverage may not be feasible, as the cost of such an exercise would be prohibitive. In such cases, principles of the invention prioritize the testing to cover all the frequently used paths in a real production environment. Also, if there are critical services that are not often used (for example, a service which manages a fire alarm), principles of the present invention generate adequate data to cover such important corner cases.

One or more embodiments of the present invention trace a services request and response during a test, and then use the trace to generate a run-time service choreography model for a process which models all the service choreography patterns that occurred. This model facilitates coverage statistical analysis according to the process definition (for example, which choreography patterns are covered, which are missed, and the frequency and con elation for each pattern appearance).

Instrumentation is added to a system to obtain the coverage measures (for example, all service requests and responses). This can be done by service invocation framework instrumentation such as, for example, IBM WebServices DataCollector. A test is run to enable the instrumentation to capture a trace Also, all the feasible patterns are explored in terms of the process definition, and the patterns from the trace are mined via statistical analysis for frequency and correlation. Furthermore, the patterns generated are compared with the patterns derived from the process to produce a report regarding the covered and uncovered patterns, as well as the frequency of co-occurrence and inter-process correlation.

One or more inventive embodiments advantageously provide coverage analysis at an entity or enterprise level, and not at program control structure level. Each choreographed pattern maps to a particular type of entity transaction, enabling a more meaningful execution for entity users to understand the test coverage, as well as making the connection between entity requirements and traces clear. Also, inter-process correlation and frequency measurement provides a deeper understanding of the modes of usage. For examples, the traces may indicate that process "A" in all cases is followed by process "B," indicating that test cases which test process "A" in isolation or with other processes are missing.

Additionally, one or more embodiments of the present invention have the advantage of not needing to know internal implementation details and consequently not needing to instrument the process itself. When a process is changed or modified, we need not do re-instrumentation, as only the service needs to be instrumented. Because the coverage measures for one or more embodiments of the invention are only service request and service response, we only need to instrument the service invocation framework. Even if the service level changes (for example, multi-server; high availability deployment, etc) we need not re-instrument the system.

Figure 2:
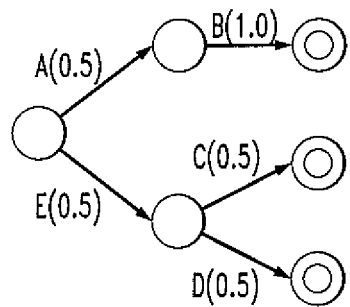
FIG. 2 is a diagram illustrating an exemplary prefix-tree acceptor, according to another aspect of the invention.

FIG, 1 shows a diagram illustrating exemplary implementation architecture, according to one aspect of the invention. Additionally, FIG. 2 is a diagram illustrating an exemplary prefix-tree acceptor, according to another aspect of the invention.

In an illustrative embodiment of the present invention, Business Process Execution Language (BPEL) is used as a process definition language. Also, the DataCollector is used to intercept and instrument web service requests and responses, as well as write information about the Web services to a log file. Exemplary implementation architecture is illustrated, as noted, in FIG. 1.

Data Collector is an instrumentation 109 which is deployed at the service gateway 107. Test case 122 can be generated by testers or an automation tool before test cases are executed. When the test cases and the system 104 under testing with instrumentation are ready, the test case execution can be started. During the test phase, service request and response are obtained Before the trace analysis 112 starts, total execution pattern 118 is identified manually or by an automation tool. The trace analysis 112 parses the trace to a set of transactions according to the correlation ID in the trace, and builds a prefix-tree acceptor for this set of transactions to mine the service invocation patterns. For example, if you have a set of transactions, AB, EC, ED and AB (each capital denotes one service operation), the prefix-tree acceptor is built as in the exemplary illustration in FIG. 2. Therefore, all the executed patterns are AB(0.5), EC(0.25), ED(0.25), which can be calculated from this tree.

The process analysis 110 generates all the possible choreography models in terms of the enterprise process definition. All of the feasible execution paths of the enterprise process 106 are generated, and a set of test paths are merged together if they have the same service operation invocations sequence through simulation execution.

The report generator 120 compares the executed patterns 114 and all the feasible execution patterns to find the unexecuted patterns 116. Still with reference to FIG. 1, item 102 is the test case executor. It can be an automation tool, such as Rational Functional Tester, or it can be a human being. Item 104 is, as noted, the system under testing with instrumentation. Item 108 is a service container. It can route the request to the right service and forward the response to the request.

It should be noted that the invention is not limited to the precise exemplary embodiments detailed herein, and that various other changes and modifications may be made by one skilled in the art.

Figure 3:
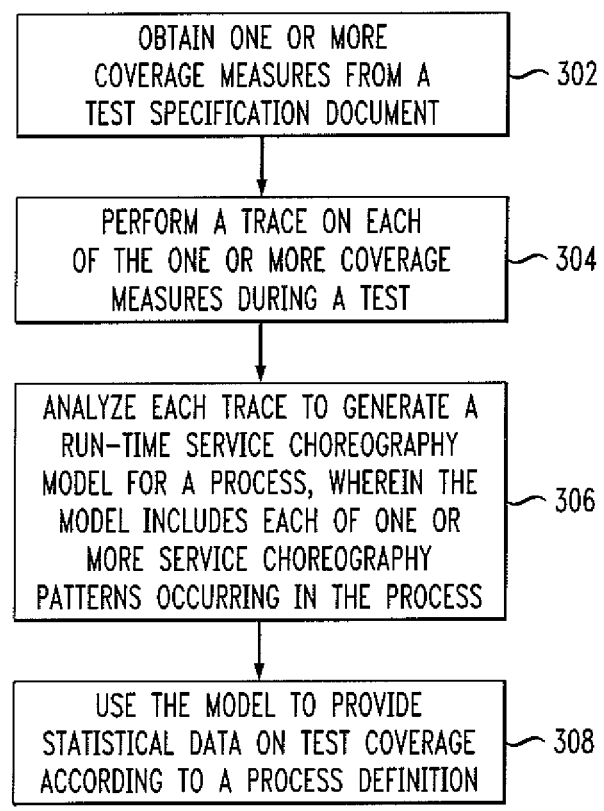
FIG. 3 is a flow diagram illustrating an exemplary method for analyzing testing coverage of one or more software modules to provide process coverage statistics, according to another aspect of the invention.

FIG. 3 is a flow diagram illustrating an exemplary method for analyzing testing coverage of one or more software modules to provide process coverage statistics, according to another aspect of the invention. Step 302 includes obtaining one or mole coverage measures from a test specification document The coverage measures can, for example, come from static analysis of a process. Also, the coverage measures can include one or more coverage measures from a plurality of vendors. For example, the process of test coverage analysis can be performed as a service for a customer, where the customer's information technology (IT) environment includes software modules from a plurality of vendors. Additionally, the coverage measures can include one or more service requests and corresponding service responses.

Step 304 includes performing a trace on each of the one or more coverage measures during a test Step 306 includes analyzing each trace to generate a run-time service choreography model for a process, wherein the model includes each of one or mote service choreography patterns occurring in the process. The process can include, for example, an enterprise process. Also, each choreography pattern can include a particular transaction (for example, an entity or enterprise transaction) Step 308 includes using the model to provide statistical data on test coverage according to a process definition. The statistical data can include, for example, patterns covered in the model, patterns uncovered in the model, frequency of co-occurrence patterns in the model, inter-process correlation statistics, path coverage and branch coverage.

Analyzing each trace in step 306 may include testing the structural integrity of one or more distributed loosely coupled services that are choreographed to perform a process. "Structural integrity" refers to the fact that the flow between different "services" that comprise the process is sound. For example, one or more embodiments of the present invention treat these "services" as black boxes and function under the assumption that they have been well-tested. In verifying structural integrity we are interested in testing whether the flow control logic between these "services" is correct. Analyzing each trace in step 306 may also include generating all feasible execution paths of the process, and merging a set of test paths together if each test path has a same service operation invocation sequence.

Using the model to provide statistical data in step 308 may include comparing each of the patterns generated in the run-time service choreography model with each of patterns derived from the process. The process represents the "code." One can generate the test patterns either from the code through simulation or by actually executing the code on a real system (for example, the "run-time" service choreography model). The comparison is between these two sets of patterns.

Performing a trace in step 304 may include parsing the trace into a set of transactions according to a correlation ID (identity) in the trace, and building a prefix-tree acceptor for the set of transactions to obtain one or more service invocation patterns. A correlation ID is a unique identifier which describes a process instance during its execution. There could be multiple instances of the same process executing at the same time (for example, multiple people using an online bank at the same time). The correlation ID can be used to group a set of service invocations together by transactions. A prefix-tree acceptor is used to identify one or mote transactions from the trace data. It can be used to describe what sentences ate accepted or to describe existing patterns. Each pattern is accepted by this tree. The node is a state and the edge is a service operation.

Figure 4:
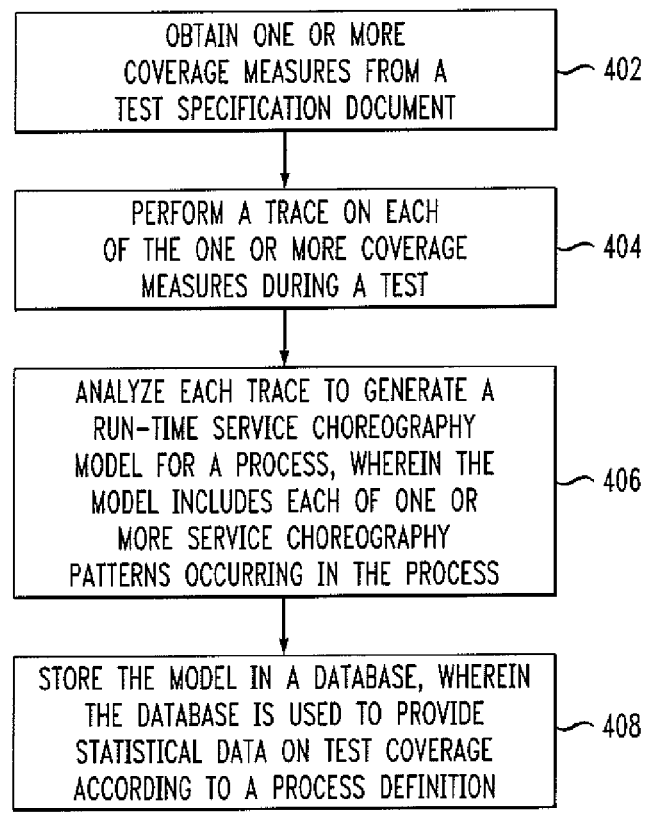
FIG. 4 is a flow diagram illustrating an exemplary method for generating a database of run-time service choreography models for a process, according to another aspect of the invention.

FIG. 4 is a flow diagram illustrating an exemplary method for generating a database of run-time service choreography models for a process, according to another aspect of the invention. Step 402 includes obtaining one or more coverage measures from a test specification document. Step 404 includes performing a trace on each of the one or more coverage measures during a test. Step 406 includes analyzing each trace to generate a run-time service choreography model for a process, wherein the model includes each of one or more service choreography patterns occurring in the process. Step 408 includes storing the model in a database, wherein that database is used to provide statistical data on test coverage according to a process definition.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 5:
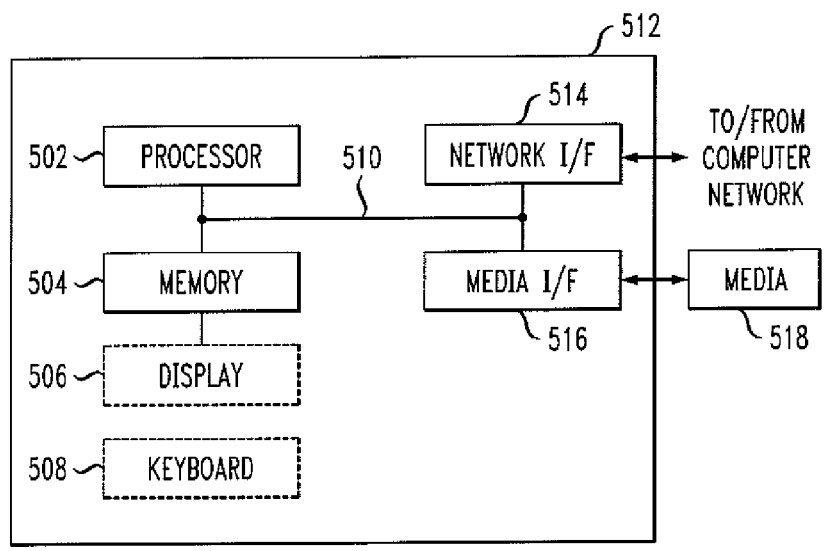
FIG. 5 is a system diagram of an exemplary computer system on which at least one embodiment of the present invention can be implemented.

At present, it is believed that the preferred implementation will make substantial use of software running on a general-purpose computer or workstation. With reference to FIG. 5, such an implementation might employ, for example, a processor 502, a memory 504, and an input and/or output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 502, memory 504, and input and/or output interface such as display 506 and keyboard 508 can be interconnected, fob example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 504), magnetic tape, a removable computer diskette (for example, media 518), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, providing coverage analysis at an entity level, not at program control structure level, as well as not needing to instrument the process itself.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for analyzing testing coverage of a plurality of software modules to provide process level coverage statistics using traces captured during production time, comprising the steps of:
obtaining one or more coverage measures from a test specification document;
performing said trace during production time on each of the one or more coverage measures during a test;
analyzing, using at least one hardware device, each trace captured during production time to create a run-time service choreography model for a process that utilizes said plurality of software modules, wherein the model includes each of one or more service choreography patterns occurring in the process, wherein said plurality of software modules comprise a plurality of distributed loosely coupled services choreographed to perform said process, wherein the analysis comprises an evaluation of a structural integrity of said plurality of distributed loosely coupled services that are choreographed to perform said process, wherein said structural integrity verifies a correctness of flow between said plurality of software modules;
using the run-time service choreography model to provide statistical data on the process level test coverage according to a process definition;
comparing a frequency of each of the one or more service choreography patterns generated in the run-time service choreography model with a frequency of each of one or more service choreography patterns derived from the process; and
prioritizing testing of a plurality of said service choreography patterns based on a frequency of occurrence in a production environment.

2. The method of claim 1, wherein the process comprises an enterprise process.

3. The method of claim 1, wherein the statistical data comprises patterns covered in the model, patterns uncovered in the model, frequency of co-occurrence patterns in the model and inter-process correlation statistics.

4. The method of claim 1, wherein the one or more coverage measures comprise one or more coverage measures from a plurality of vendors.

5. The method of claim 1, wherein each choreography pattern comprises a particular transaction.

6. The method of claim 1, wherein the one or more coverage measures comprise one or more service requests and corresponding service responses.

7. The method of claim 1, wherein the step of performing said trace during production time on each of the one more coverage measures during a test comprises the steps of:
parsing the trace into a set of transactions according to a correlation ID in the trace; and
building a prefix-tree acceptor for the set of transactions to obtain one or more service invocation patterns, wherein said prefix-tree acceptor is used to identify one or more transactions from the trace data.

8. The method of claim 1, wherein the step of analyzing each trace captured during production time comprises the steps of:
generating all feasible execution paths of the process; and
merging a set of test paths together if each test path has a same service operation invocation sequence.

9. An apparatus comprising:
a memory; and
at least one hardware device, coupled to the memory, operative to implement the following steps:
obtaining one or more coverage measures from a test specification document;
performing a trace during production time on each of the one or more coverage measures during a test;
analyzing, using at least one hardware device, each trace captured during production time to create a run-time service choreography model for a process that utilizes said plurality of software modules, wherein the model includes each of one or more service choreography patterns occurring in the process, wherein said plurality of software modules comprise a plurality of distributed loosely coupled services choreographed to perform said process, wherein the analysis comprises an evaluation of a structural integrity of said plurality of distributed loosely coupled services that are choreographed to perform said process, wherein said structural integrity verifies a correctness of flow between said plurality of software modules;
using the run-time service choreography model to provide statistical data on test coverage according to a process definition;
comparing a frequency of each of the one or more service choreography patterns generated in the run-time service choreography model with a frequency of each of one or more service choreography patterns derived from the process; and
prioritizing testing of a plurality of said service choreography patterns based on a frequency of occurrence in a production environment.

10. A computer program product comprising a non-transitory computer useable readable recordable storage medium having computer useable program code for analyzing testing coverage of one or more software modules to provide process level coverage statistics using traces during production time, said computer program product including:
computer useable program code for obtaining one or more coverage measures from a test specification document;
computer useable program code for performing said trace during production time on each of the one or more coverage measures during a test;
computer useable program code for analyzing, using at least one hardware device, each trace to create a run-time service choreography model for a process that utilizes said plurality of software modules, wherein the model includes each of one or more service choreography patterns occurring in the process, wherein said plurality of software modules comprise a plurality of distributed loosely coupled services choreographed to perform said process, wherein the analysis comprises an evaluation of a structural integrity of said plurality of distributed loosely coupled services that are choreographed to perform said process, wherein said structural integrity verifies a correctness of flow between said plurality of software modules;

using the run-time service choreography model to provide statistical data on test coverage according to a process definition;

comparing a frequency of each of the one or more service choreography patterns generated in the run-time service choreography model with a frequency of each of one or more service choreography patterns derived from the process; and prioritizing testing of a plurality of said service choreography patterns based on a frequency of occurrence in a production environment.

11. The computer program product of claim 10, wherein the process comprises an enterprise process.

12. The computer program product of claim 10, wherein the statistical data comprises patterns covered in the model, patterns uncovered in the model, frequency of co-occurrence patterns in the model and inter-process correlation statistics.

13. The computer program product of claim 10, wherein the one or more coverage measures comprise at least one of one or more coverage measures from a plurality of vendors and one or more service requests and corresponding service responses.

14. The computer program product of claim 10, wherein each choreography pattern comprises a particular transaction.

15. The computer program product of claim 10, wherein the computer useable program code for performing said trace during production time on each of the one more coverage measures during a test comprises:

computer useable code for parsing the trace into a set of transactions according to a correlation ID in the trace; and computer useable code for building a prefix-tree acceptor for the set of transactions to obtain one or more service invocation patterns.

16. The computer program product of claim 10, wherein the computer useable program code for analyzing each trace captured during production time comprises:

computer useable code for generating all feasible execution paths of the process; and computer useable code for merging a set of test paths together if each test path has a same service operation invocation sequence.

17. The method of claim 1, wherein said process level test coverage can be generated by one or more of testers and an automation tool before said testing is executed.

* * * * *

UNITED STATES PATENT AND TRADEMARK OFFICE
CERTIFICATE OF CORRECTION

| | |
|---|---|
| PATENT NO. | : 9,519,571 B2 |
| APPLICATION NO. | : 11/777340 |
| DATED | : December 13, 2016 |
| INVENTOR(S) | : Zhong Jie Li et al. |

It is certified that error appears in the above-identified patent and that said Letters Patent is hereby corrected as shown below:

In the Specification

Column 1, Line 15, replace "changing needs Repeatable tasks" with --changing needs. Repeatable tasks--.

Column 1, Line 22, replace "same operation It is advantageous" with --same operation. It is advantageous--.

Column 2, Line 14, replace "in the from of" with --in the form of--.

Column 3, Line 3, replace "con elation" with --correlation--.

Column 3, Lines 8-9, replace "IBM WebServices DataCollector" with --IBM Web Services Data Collector--.

Column 3, Line 10, replace "capture a trace Also, all" with --capture a trace. Also, all--.

Column 3, Lines 26-27, replace "For examples, the traces" with --For example, the traces--.

Column 3, Line 41, replace "deployment, etc) we need not" with --deployment, etc.), we need not--.

Column 3, Line 43, replace "FIG,1" with --FIG.1--.

Column 3, Line 50, replace "DataCollector" with --Data Collector--.

Column 3, Line 61, replace "obtained Before the trace" with --obtained. Before the trace--.

Column 4, Line 29, replace "one or mole" with --one or more--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)

U.S. Pat. No. 9,519,571 B2

Column 4, Line 30, replace "document The coverage measures" with --document. The coverage measures--.

Column 4, Line 40, replace "during a test Step 306 includes" with --during a test. Step 306 includes--.

Column 4, Line 43, replace "one or mote services" with --one or more services--.

Column 4, Line 47, replace "enterprise transactions) Step 308" with --enterprise transactions). Step 308--.

Column 5, Line 20, replace "one or mote" with --one or more--.

Column 5, Line 22, replace "sentences ate accepted" with --sentences are accepted--.

In the Claims

In Claim 7, Line 66, replace "each of the one more" with --each of the one or more--.

In Claim 15, Line 5, replace "each of the one more" with --each of the one or more--.